United States Patent
J et al.

(10) Patent No.: US 10,880,121 B1
(45) Date of Patent: Dec. 29, 2020

(54) PROVISIONING QOS BEHAVIOR ON TUNNEL ENDPOINTS

(71) Applicant: Juniper Networks, Inc., Sunnyvale, CA (US)

(72) Inventors: Nirmala J, Bangalore (IN); Harish Pandey, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/369,465

(22) Filed: Mar. 29, 2019

(51) Int. Cl.
*H04L 12/46* (2006.01)

(52) U.S. Cl.
CPC ...... *H04L 12/4633* (2013.01); *H04L 2212/00* (2013.01)

(58) Field of Classification Search
CPC .................................................. H04L 12/4633
See application file for complete search history.

(56) References Cited

U.S. PATENT DOCUMENTS

| | | | | |
|---|---|---|---|---|
| 2011/0299414 A1* | 12/2011 | Yu | ....................... | H04L 12/4641 370/252 |
| 2013/0091349 A1* | 4/2013 | Chopra | ............. | H04W 12/0808 713/150 |
| 2014/0269705 A1* | 9/2014 | DeCusatis | ............... | H04L 45/52 370/390 |
| 2015/0146741 A1* | 5/2015 | Zhang | ................. | H04L 12/5601 370/437 |
| 2015/0381531 A1* | 12/2015 | Huang | ................ | H04L 12/4645 370/401 |
| 2018/0025052 A1* | 1/2018 | Nambiar | ............. | G06F 16/2455 707/713 |
| 2019/0044657 A1* | 2/2019 | Biederman | ............. | H04L 47/32 |
| 2020/0042350 A1* | 2/2020 | Deval | .................... | G06F 9/4881 |
| 2020/0177503 A1* | 6/2020 | Hooda | .................... | H04L 45/64 |

OTHER PUBLICATIONS

Feerick, "Learn About Quality of Service (QoS)" Juniper Networks, Inc., Dec. 2015, 17 pp.
Mahalingam et al., "Virtual eXtensible Local Area Network (VXLAN) : A Framework for Overlaying Virtualized Layer 2 Networks over Layer 3 Networks," RFC 7348, Independent Submission, The IETF Trust, Aug. 2014, 22 pp.

(Continued)

*Primary Examiner* — Gary Mui
(74) *Attorney, Agent, or Firm* — Shumaker & Sieffert, P.A.

(57) ABSTRACT

In general, techniques are described for provisioning Quality of Service (QoS) behavior on tunnel endpoints. For example, a network device operating as a source tunnel endpoint, e.g., a provider edge (PE) device, may encapsulate a QoS behavior that was derived by the PE device upon receiving the packet from a source network (e.g., a customer or tenant network) and send the encapsulated packet through the tunnel across one or more intermediate networks (such as data center networks) to the destination tunnel endpoint such that the destination tunnel endpoint may apply the same QoS behavior derived by the source tunnel endpoint when injecting the original packet into a destination network (e.g., a second network of the customer or tenant) without having to re-derive the QoS behavior from customer/tenant QoS policies for the destination network.

17 Claims, 4 Drawing Sheets

(56) References Cited

OTHER PUBLICATIONS

Garg et al. "NVGRE: Network Virtualization Using Generic Routing Encapsulation" RFC 7637, Independent Submission, Sep. 2015, 17 pp.
Farinacci et al., "Generic Routing Encapsulation (GRE)," RFC 2784, Network Working Group, Mar. 2000, 9 pp.
Pignataro et al. "IPv6 Support for Generic Routing Encapsulation (GRE)" Internet Engineering Task Force (IETF), RFC 7676, Oct. 2015, 11 pp.
Worster, "Encapsulating MPLS in IP or Generic Routing Encapsulation (GRE)," Network Working Group, RFC 4023, Mar. 2005, 14 pp.
Postel "User Datagram Protocol," Network Working Group, Internet Engineering Task Force, RFC 768, Aug. 28, 1980, 3 pp.
Xu, "Encapsulating MPLS in UDP," Internet Engineering Task Force (IETF), RFC 7510, Apr. 2015, 20 pp.
Dommety, G. "Key and Sequence Number Extensions to GRE" Network Working Group, RFC 2890, Sep. 2000, 7 pp.

* cited by examiner

PROVISIONING QOS BEHAVIOR ON TUNNEL ENDPOINTS

TECHNICAL FIELD

The disclosure relates to computer networks, and, more particularly, to network devices providing packet forwarding.

BACKGROUND

A computer network is a collection of interconnected network devices that can exchange data and share resources. Example network devices include switches or other layer two (L2) devices that operate within the second layer of the Open Systems Interconnection (OSI) reference model, i.e., the data link layer, and routers or other layer three (L3) devices that operate within the third layer of the OSI reference model, i.e., the network layer. Network devices within computer networks often include a control unit that provides a control plane functionality for the network device and forwarding components for routing or switching data units.

Two or more remote L2 customer networks may communicate through an intermediate L3 network (usually referred to as a service provider network or core network). In some configurations, network devices, e.g., provider edge (PE) devices, may be connected by an IP infrastructure in which case IP/GRE tunneling or other IP tunneling (e.g., Virtual Extensible LAN (VXLAN) or Network Virtualization using Generic Routing Encapsulation (NVGRE)) can be used between the network devices. In some configurations, the PE devices may be connected by a multiprotocol label switching (MPLS), Generic Routing Encapsulation (GRE), User Datagram Protocol (UDP), or another tunneling protocol.

Customers may request services (e.g., video) from a service provider. The customers expect that these services are provided by the service provider with an acceptable level of quality, commonly referred to as Quality of Service (QoS). The QoS may be affected by various parameters, including latency, delay (inter frame gap), jitter, packet loss, and throughput. To manage traffic based on these parameters, network devices may, for example, differentiate traffic into classes of services based on packet values and apply QoS behaviors (e.g., prioritize traffic) associated with the classes of services.

SUMMARY

In general, techniques are described for provisioning Quality of Service (QoS) behavior on tunnel endpoints. For example, a network device operating as a source tunnel endpoint, e.g., a provider edge (PE) device, may encapsulate a QoS behavior that was derived by the PE device upon receiving the packet from a source network (e.g., a customer or tenant network) and send the encapsulated packet through the tunnel across one or more intermediate networks (such as data center networks) to the destination tunnel endpoint such that the destination tunnel endpoint may apply the same QoS behavior derived by the source tunnel endpoint when injecting the original packet into a destination network (e.g., a second network of the customer or tenant) without having to re-derive the QoS behavior from customer/tenant QoS policies for the destination network.

As one example, PE device may use any tunneling protocol (e.g., VXLAN, GRE, etc.) over an L3 intermediate network to communicate L2 traffic over the L3 intermediate network between tunnel endpoints. In this example, the PE device operating as the source tunnel endpoint may derive a QoS behavior for a packet based on customer/tenant specific QoS policies of the source network, encapsulate the QoS behavior to the packet, for example, within a tagging packet frame (e.g., Institute of Electrical and Electronics Engineers (IEEE) 802.1q), in addition to an outer tunnel transport header, and send the encapsulated packet across the tunnel to a destination tunnel endpoint. Instead of re-deriving the QoS behavior at the destination tunnel endpoint based on customer/tenant QoS policies for the destination network, the destination tunnel endpoint can apply the same QoS behavior that was derived by the source tunnel endpoint.

The techniques described herein are integrated into a practical application that may provide one or more technical advantages. For example, by encapsulating a QoS behavior within the tagging packet frame, the QoS behavior can be sent across any type of tunnel (i.e., tunnel protocol agnostic). Moreover, by encapsulating a QoS behavior at the front-end of a tunnel, tunnel endpoints to enforce the same QoS behavior across the tunnel endpoints. Additionally, a destination tunnel endpoint does not re-derive the QoS behavior for the packet, thereby reducing the complexity of enforcing QoS across the network. For example, customer-specific QoS policies may be applied upon receiving the packet based on the particular customer network from which the packet was received to determine QoS behavior to be applied at the end of the tunnel upon injecting the packet back into a customer network, thereby reducing the requirement of re-deriving customer-specific QoS policies for the original packet.

In one example, a method includes receiving, by a first provider edge (PE), a layer 2 (L2) packet from a source network that is destined for a destination network, wherein the first PE device is configured to provide a network overlay over a layer 3 core network using a tunneling protocol, and wherein the first PE device for the source network and a second PE device for the destination network are peer tunneling endpoints of a tunnel for the tunneling protocol; deriving, by the first PE device, a Quality of Service (QoS) behavior for the packet to be applied by the second network device when injecting the packet to the destination network; encapsulating, by the first PE device, the QoS behavior to the packet; encapsulating, by the first PE device, an outer tunnel transport header that identifies the peer tunneling endpoints to the packet; and sending, by the first PE device, the encapsulated packet through the tunnel to the second PE device.

In another example, a network device includes one or more processors operably coupled to a memory, wherein the one or more processors are configured to: receive configuration data that configures the network device to provide a network overlay over a layer 3 core network using a tunneling protocol, wherein the network device for a source network and a second network device for a destination network are peer virtual tunneling endpoints for a tunnel of the tunneling protocol; receive a layer 2 (L2) packet from the source network that is destined for the destination network; derive a Quality of Service (QoS) behavior for the packet to be applied by the second network device when injecting the packet to the destination network; encapsulate the QoS behavior to the packet; encapsulate an outer tunnel transport header that identifies the peer tunneling endpoints to the packet; and send the encapsulated packet through the tunnel to the second network device.

In yet another example, a non-transitory computer-readable storage medium comprises instructions for causing at least one programmable processor of a network device to: receive configuration data that configures the network device to provide a network overlay over a layer 3 core network using a tunneling protocol, wherein the network device for a source network and a second network device for a destination network are peer virtual tunneling endpoints for a tunnel of the tunneling protocol; receive a layer 2 (L2) packet from the source network that is destined for the destination network; derive a Quality of Service (QoS) behavior for the packet to be applied by the second network device when injecting the packet to the destination network; encapsulate the QoS behavior to the packet; encapsulate an outer tunnel transport header that identifies the peer tunneling endpoints to the packet; and send the encapsulated packet through the tunnel to the second network device.

The details of one or more examples of the techniques are set forth in the accompanying drawings and the description below. Other features, objects, and advantages of the techniques will be apparent from the description and drawings, and from the claims.

DETAILED DESCRIPTION

Figure 1:
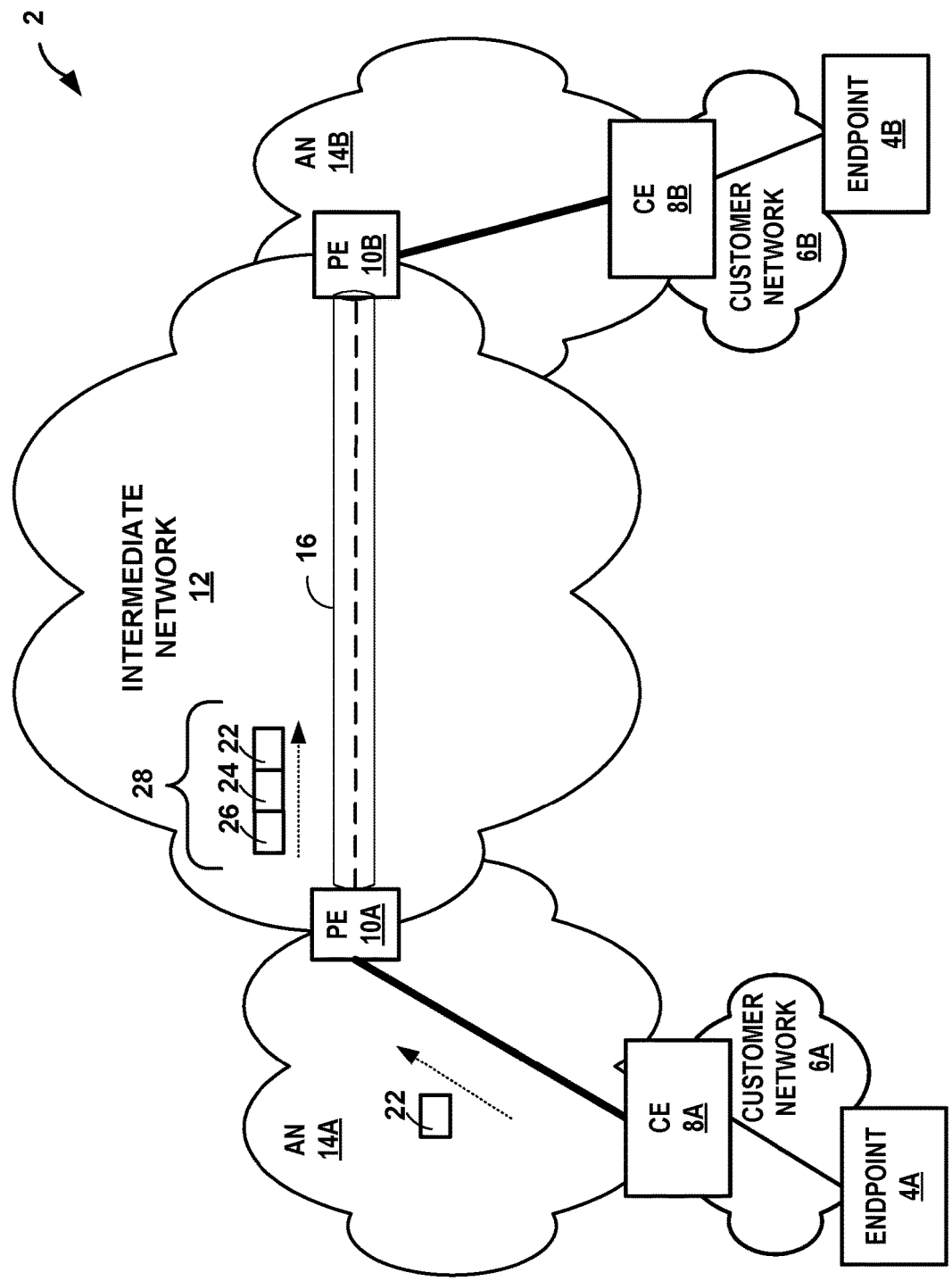
FIG. 1 is a block diagram illustrating an example network system configured to implement one or more techniques described herein.

FIG. 1 is a block diagram illustrating an example network system 2 configured to implement one or more techniques described herein. In the example of FIG. 1, PE devices 10A-10B ("PE devices 10" or, more simply, "PEs 10") provide customer endpoints 4A-4B ("endpoints 4") associated with customer networks 6A-6B ("customer networks 6") with access to a layer 3 (L3) intermediate network 12 (alternatively referred to herein as the "core network 12" or the "service provider network 12") via customer edge (CE) devices 8A-8B ("CE devices 8" or, more simply, "CEs 8"). The configuration of network system 2 illustrated in FIG. 1 is merely an example. For example, an enterprise may include any number of customer networks 6 interconnected by PE devices 10. Nonetheless, for ease of description, only customer networks 6A-6B are illustrated in FIG. 1.

Customer networks 6 may be networks for geographically or logically separated sites of an enterprise or may represent networks for different customers of the intermediate network 12 (or tenants of a data center network). Each of endpoints 4 may represent one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Each of endpoints 4 may be a host, server, virtual machine, container, or other source or destination for L2 traffic.

PEs 10 and CEs 8 may each represent a router, switch, or other suitable network device that participates in a layer two (L2) network, such as a physical or virtual LAN. CEs 8 may attach to PEs 10 via access networks 14A, 14B (collectively, "access networks 14"). Each of access networks 14 may include a network of transport routers that transport L2 communications for customer networks 6 through respective access networks 14 for that customer. In some examples, one or more of access networks 14 may represent any L2 network. In some examples, any one or more of CEs 8 may be a customer endpoint or "host."

PEs 10 may exchange routing information via intermediate network 12 and process the routing information, selecting paths through its representation of the topology of the intermediate network 12 to reach all available destinations to generate forwarding information. In other words, PEs 10 reduce these paths to so-called "next hops" which identify which of its interfaces traffic destined for a particular destination is to be forwarded. Each of PEs 10 then installs this forwarding information in a forwarding plane of the respective one of PEs 10, whereupon the forwarding plane forwards received traffic in accordance with the forwarding information.

Intermediate network 12 may represent a service provider network that is owned and operated by a service provider, which is usually a large telecommunications entity or corporation. Intermediate network 12 represents an L3 computer network, such as a wide area network (WAN), where reference to a layer followed by a number refers to a corresponding layer in the Open Systems Interconnection (OSI) model. Intermediate network 12 is an L3 network in the sense that it natively supports L3 operations as described in the OSI model. Common L3 operations include those performed in accordance with L3 protocols, such as the Internet protocol (IP). L3 is also known as a "network layer" in the OSI model and the "IP layer" in the TCP/IP model, and the term L3 may be used interchangeably with the "network layer" and "IP" throughout this disclosure. Intermediate network 12 may also implement Multiprotocol Label Switching (MPLS) to route traffic using labels, for example. As such, intermediate network 12 may alternatively be referred to as an "MPLS/IP core network."

Although not illustrated, intermediate network 12 may be coupled to one or more networks administered by other providers, and may thus form part of a large-scale public network infrastructure, e.g., the Internet. Consequently, customer networks 6 may be viewed as edge networks of the Internet where the core network is a service provider network. Intermediate network 12 may provide networking devices within customer networks 6 with access to the Internet, and may allow the networking devices within the customer networks to communicate with each other. In some cases, intermediate network 12 represents a data center L2/L3 switching fabric (or "data center fabric network") that interconnects CEs 8 for tenants of the data center, where a tenant may represent an organization or a logical partitioning of resources, data, and/or applications within the data center.

Although additional network devices are not shown for ease of explanation, it should be understood that network system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

Intermediate network 12 may provide a number of residential and business services, including residential and business class data services (which are often referred to as "Internet services" in that these data services permit access to the collection of publicly accessible networks referred to as the Internet), residential and business class telephone and/or voice services, and residential and business class television services. One such business class data service offered by intermediate network 12 includes an L2 EVPN service. Intermediate network 12 that represents an L2/L3 switch fabric for one or more data centers may implement an L2 EVPN service. An EVPN is a service that provides a form of L2 connectivity across an L3 network, such as intermediate network 12, to interconnect two or more L2 customer networks, such as L2 customer networks 6, that may be located in different geographical areas (in the case of service provider network implementation) and/or in different racks (in the case of a data center implementation). Often, EVPN is transparent to the customer networks in that these customer networks are not aware of the intervening core network and instead act and operate as if these customer networks were directly connected and form a single L2 network. In a way, EVPN enables a form of a transparent LAN connection between two customer sites that each operates an L2 network and, for this reason, EVPN may also be referred to as a "transparent LAN service."

In the example of FIG. 1, intermediate network 12 may implement a tunneling protocol to establish tunnel 16 to tunnel traffic between L2 customer networks 6 over the L3 intermediate network 12. In one example, PEs 10 may implement VXLAN that provides a tunneling scheme to overlay L2 networks on top of L3 networks. VXLANs establish tunnels for communicating traffic, e.g., L2 broadcast, unknown unicast, and multicast (BUM) packets, over common physical IP infrastructure between Network Virtualization Edges/VXLAN Tunneling Endpoints (VTEPs), e.g., PEs 10. That is, VXLAN creates virtual L2 networks spanning physical L3 networks between VTEPs. For example, PEs 10 operating as VTEPs may encapsulate VXLAN traffic and de-encapsulate that traffic when it leaves the VXLAN tunnel. As one example, VTEPs communicate traffic with a 24-bit segment ID, Virtual Network Identifier (VNI), that uniquely identifies the VXLAN. For instance, the VNI maps to a tenant Virtual Local Area Network (VLAN) identifier, where the tenant VLAN identifier gets mapped to an EVPN instance (EVI). The VNI is included in an outer header that encapsulates an inner MAC frame such that MAC addresses may overlap across segments, but are isolated using the VNI. In a way, VXLAN "stretches" an L2 network over an intermediate L3 network. Additional examples of VXLAN are described in "Virtual eXtensible Local Area Network (VXLAN): A Framework for Overlaying Virtualized Layer 2 Networks over Layer 3 Networks," Request for Comments 7348, August 2014, the entire contents of which is incorporated by reference herein.

For purposes of illustration, tunnel 16 is described with respect to the VXLAN tunneling protocol, but may be implemented with any tunneling protocol, such as a Network Virtualization using Generic Routing Encapsulation (NVGRE) protocol to provide an overlay tunneling protocol to encapsulate traffic and tunnel the traffic over a physical IP infrastructure between Network Virtualization Endpoints (NVEs). NVGRE uses Virtual Subnet Identifiers (VSIDs) to identify virtual L2 networks. Either VXLAN or NVGRE tunneling protocols may be used to provide tunneling of L2 BUM traffic over intermediate network 12 to provide network virtualization overlay between PEs 10. Additional examples of NVGRE are described in "NVGRE: Network Virtualization Using Generic Routing Encapsulation," Request for Comments 7637, September 2015, the entire contents of which is incorporated by reference herein.

In other examples in which intermediate network 12 implements MPLS, tunnel 16 may be, for example, one or more Label Switched Paths (LSPs) between PEs 10. PEs 10 may use Label Distribution Protocol (LDP), Resource Reservation Protocol (RSVP), RSVP with traffic engineering (RSVP-TE), or other label switching protocols. In further examples, tunnel 16 may be a Generic Routing Encapsulation (GRE) tunnel, MPLS-over-GRE tunnel, User Datagram Protocol (UDP) tunnel, or MPLS-over-UDP. Additional examples of GRE tunneling are described in "Generic Routing Encapsulation (GRE)," Network Working Group, Request for Comments 2784, March 2000, "Key and Sequence Number Extensions to GRE," Network Working Group, Request for Comments 2890, September 2000, "IPv6 Support for Generic Routing Encapsulation (GRE)," Internet Engineering Task Force (IETF), Request for Comments 7676, October 2015, and "Encapsulating MPLS in IP or Generic Routing Encapsulation (GRE)," Network Working Group of the Internet Engineering Task Force, Request for Comments 4023, March 2005, the entire contents of each of which is incorporated by reference herein. Additional examples of UDP tunneling are described in "User Datagram Protocol," Request for Comments 768, Aug. 28, 1980, and "Encapsulating MPLS in UDP," Network Working Group of the Internet Engineering Task Force, Request for Comments 7510, April 2015, the entire contents of each of which is incorporated by reference herein.

In the example of FIG. 1 where PEs 10 provide VXLAN, PEs 10 operate as tunneling endpoints (VTEPs) for the VXLAN tunnel 16 to encapsulate VXLAN traffic and de-encapsulate VXLAN traffic when it leaves the VXLAN tunnel. For example, PE 10A may receive L2 traffic from customer network 6A, and encapsulate the L2 traffic with a VXLAN header to tunnel the traffic across VXLAN tunnel 16 to a destination VTEP, e.g., PE 10B. In this way, PEs 10 provide an EVPN-VXLAN network overlay using a VLXAN underlay to transport L2 communications, such as Ethernet packets or "frames," for customer networks 6, in a transparent manner, i.e., as if the core network 12 does not exist and customer networks 6 were instead directly connected.

Customers of customer networks 6 may request services, e.g., video, data, etc., from a service provider and expect that these services are provided with an acceptable level of quality. The quality of traffic may be affected by various parameters, including latency, delay (inter frame gap), jitter, packet loss, and throughput. Based on these parameters, network devices, e.g., PEs 10, may implement Quality of Service (QoS) techniques to forward traffic with different QoS behaviors. For example, network devices may use a class-based classification process which differentiates (otherwise referred to herein as "classifies") traffic into groups, called "classes of service," and applies a QoS behavior (e.g., prioritizing) associated with the class. The QoS techniques may be defined by customer/tenant specific policies.

As one example, a network device, e.g., PE 10A, may classify traffic based on various values in the received packet (e.g., 5-tuple information such as source/destination address, source/destination port, protocol). For example, network devices may classify inbound traffic into different classes.

Based on the assigned classes, the network devices may apply different QoS behaviors that affects how the network device treats the traffic. Examples of QoS behaviors may include prioritizing traffic over other traffic, filtering traffic upon ingress or egress, controlling the allowed bandwidth transmitted or received on the interfaces of the device, reading and writing QoS behavior requirements in the packet header, controlling congestion by sending the highest priority traffic first based on scheduler queueing priorities, controlling packet loss using random early detection (RED) algorithms to determine which packets to drop and which packets to process, and others behaviors to affect how the network device treats the traffic.

In some examples, a network device may inform downstream network devices the derived QoS behavior by copying the QoS behavior from an inner packet to an outer tunnel transport header. For example, network devices may typically implement a Differentiated Services (DiffServ) model to configure a Differentiated Services field (DS field) of an IP header that defines the QoS behavior. For example, the DS field may be a 6-bit Differentiated Services Code Point (DSCP) value that identifies a priority class and a drop precedence. A downstream network device may use the DS field to re-derive the QoS behavior for the packet. These network devices typically communicate the QoS behavior (e.g., DSCP value) by copying a DSCP value from an inner packet to the outer tunnel transport header. However, when the traffic is tunneled, the traffic during transit may experience conditions that cause the QoS behavior to change. For example, intermediate network 12 may include one or more intermediate network devices (not shown) between PEs 10. As the packet traverses through intermediate network 12, these intermediate network devices may change the DSCP value based on various parameters (e.g., latency) experienced in intermediate network 12. This may cause the destination tunnel endpoint to derive a different QoS behavior than the QoS behavior that was derived by the source tunneling endpoint.

In accordance with the techniques described herein, tunneling endpoints, e.g., PEs 10, may encapsulate a QoS behavior that was derived by the source tunneling endpoint upon receiving the packet from a source network and send the encapsulated packet through a tunnel across one or more intermediate networks to the destination tunnel endpoint such that the destination tunnel endpoint may apply the same QoS behavior derived by the source tunnel endpoint when injecting the original packet into a destination network without having to re-derive the QoS behavior from customer/tenant QoS policies for the destination network.

As one example, PE 10A may receive an L2 packet 22 from a host, e.g., endpoint 4A, that is destined for endpoint 4B. Packet 22 may include values, such as 5-tuple values including a source MAC address of endpoint 4A, a destination MAC address of endpoint 4B, a source IP address of endpoint 4A, and a destination IP address of endpoint 4B. Using these values (or other packet values such as port or protocol), PE 10A may classify packet 22 based on customer/tenant specific QoS policies of the source network, e.g., customer network 6A, derive a QoS behavior based on the classification, and apply the QoS behavior to packet 22. The QoS behavior may be represented as a QoS behavior value 24 (referred to herein as "QoS behavior 24" or "QoS behavior value 24") that identifies a priority class and a drop precedence of packet 22, as further described in FIG. 2 below.

PE 10A may encapsulate the derived QoS behavior 24 (e.g., priority class and drop precedence) to packet 22. For example, PE 10A may encapsulate the QoS behavior 24 within a tagging packet frame, such as a tagging packet frame in accordance with the 802.1Q tag format. As one example, an 802.1Q packet may comprise a Tag Protocol Identifier (TPID) that identifies the packet as an IEEE 802.1 Q-tagged frame. As one example, the 802.1Q packet may comprise 32 bits with 16 bits reserved for the TPID set to a value of 0x8xxx. The remaining 16 bits of the 802.1Q packet may be used to denote the QoS behavior derived by PE 10A. As one example, 5 bits of the remaining 16 bits may be used to denote the QoS behavior. More specifically, PE 10A may denote the first 3 bits as the priority class (i.e., the class of service to which the packet is assigned) and 2 bits as the drop precedence (i.e., the loss characteristics allowed for the packet). The remaining 11 bits may be used to carry other information, such as other QoS policy derivatives.

PE 10A may then encapsulate the packet with an outer tunnel transport header 26 to tunnel packet 22 including the derived QoS behavior 24 over tunnel 16. In the example of FIG. 1 in which PEs 10 implement VXLAN, outer tunnel transport header 26 may include, for example, a source MAC address of the source VTEP, e.g., PE 10A, a destination MAC address of the destination VTEP, e.g., PE 10B, a source IP address of the source VTEP, a destination IP address of the destination VTEP, and a VNI that indicates the VXLAN overlay network. The outer tunnel transport header 26 also includes a tunnel header. For example, in the case of a VXLAN tunnel, the tunnel header may include a User Datagram Protocol (UDP) header including a source UDP port and destination UDP port. The tunnel header may differ based on the tunneling scheme implemented.

PE 10A sends the encapsulated packet 28 across tunnel 16 to a destination tunnel endpoint, e.g., PE 10B. When PE 10B receives the encapsulated packet, PE 10B may de-encapsulate the outer tunnel transport header 26 and apply the encapsulated QoS behavior 26 that was derived by PE 10A. That is, PE 10A may derive the QoS behavior for the receiving network, e.g., customer network 6B, and inject the derived QoS behavior across intermediate network 12 over tunnel 16 such that PE 10B applies the QoS behavior derived by PE 10A without having to re-derive the QoS behavior from customer/tenant QoS policies for customer network 6B.

The techniques described herein are integrated into a practical application that may provide one or more technical advantages. For example, by encapsulating a QoS behavior within the tagging packet frame, the QoS behavior can be sent across any type of tunnel (i.e., tunnel protocol agnostic). Moreover, by encapsulating a QoS behavior at the front-end of a tunnel, tunnel endpoints to enforce the same QoS behavior across the tunnel endpoints. Additionally, a destination tunnel endpoint does not re-derive the QoS behavior for the packet, thereby reducing the complexity of enforcing QoS across the network. For example, customer-specific QoS policies may be applied upon receiving the packet based on the particular customer network from which the packet was received to determine QoS behavior to be applied at the end of the tunnel upon injecting the packet back into a customer network, thereby reducing the requirement of re-deriving customer-specific QoS policies for the original packet.

Figure 2:
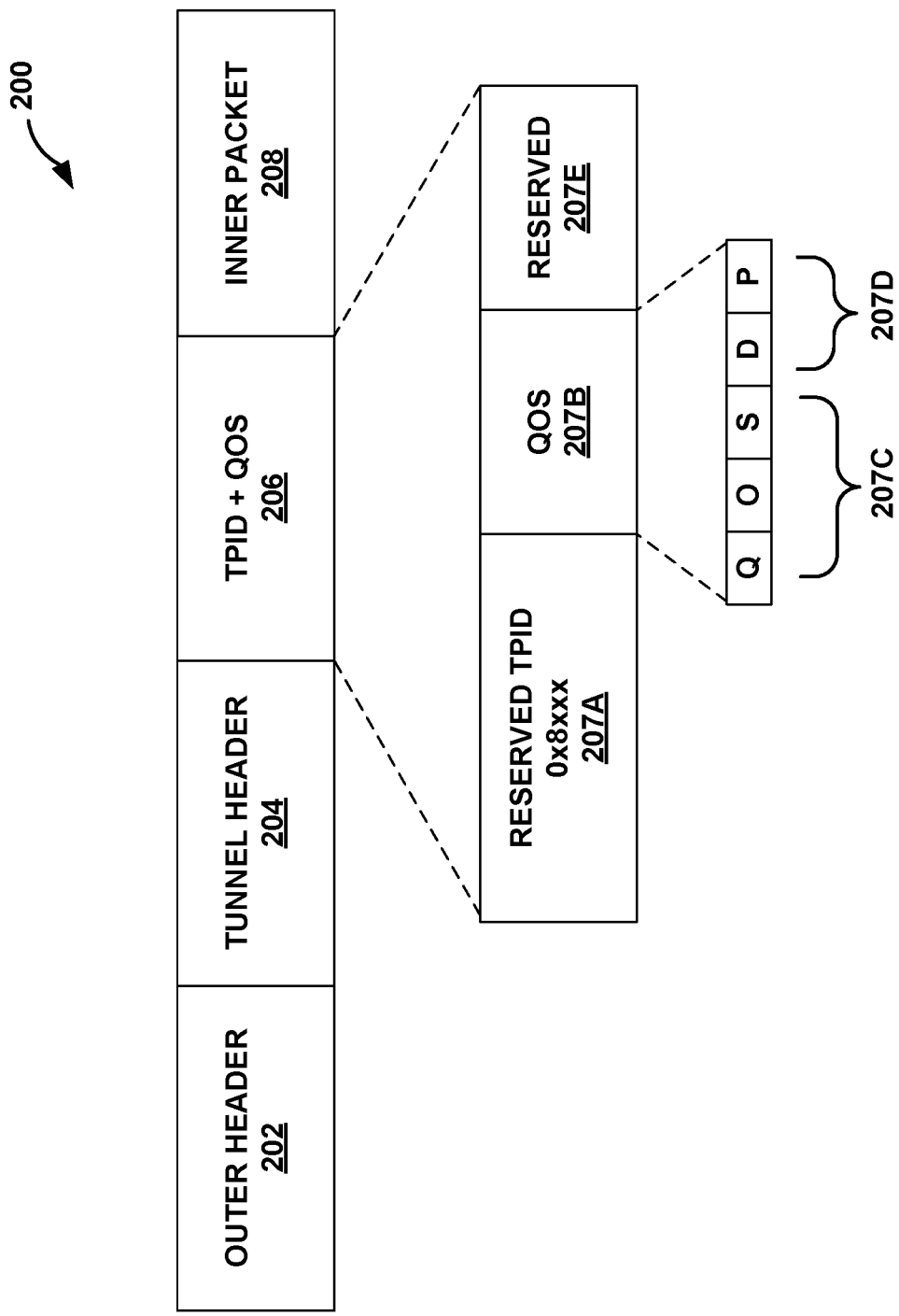
FIG. 2 is a block diagram illustrating an example packet encapsulated with a derived QoS behavior, in accordance with the techniques described herein.

FIG. 2 is a block diagram illustrating an example packet encapsulated with a derived QoS behavior, in accordance with the techniques described herein. Packet 200 of FIG. 2 may represent packet 28 of FIG. 1. In the example of FIG. 2, packet 200 may include an outer header 202, tunnel header 204, TPID and QoS 206, and inner packet 208.

Outer header 202 may include source and destination network addresses of the tunneling endpoints. For example, outer header 202 may include a source MAC address of the source tunneling endpoint (e.g., PE 10A of FIG. 1), a destination MAC address of the destination tunneling endpoint (e.g., PE 10B of FIG. 1), a source IP address of the source tunneling endpoint (e.g., PE 10A), a destination IP address of the destination tunneling endpoint (e.g., PE 10B).

The tunnel header 204 may include tunneling information based on the tunneling scheme implemented. In examples where a VXLAN tunneling scheme is implemented, tunnel header 204 may include a UDP header including a source UDP port, destination UDP port, UDP length, and UDP checksum, as described in RFC 7348. In other examples where a GRE tunneling scheme is implemented, tunnel header 204 may include a GRE header including a protocol type of the payload, a checksum, and reserved fields, as described in RFC 2784 and RFC 2890.

In examples where a VXLAN tunneling scheme is implemented, packet 200 may include a VNI (not shown in FIG. 2) that indicates the VXLAN overlay network. The VNI is a 24-bit segment ID that uniquely identifies the VXLAN.

Inner packet 208 includes the source and destination network addresses of the host devices (e.g., endpoints 4 of FIG. 1). For example, inner packet 208 includes a source MAC address of a source host (e.g., endpoint 4A of FIG. 1), a destination MAC address of a destination host (e.g., endpoint 4B of FIG. 1), a source IP address of endpoint 4A, and a destination IP address of endpoint 4B.

In accordance with the techniques described herein, a tunneling endpoint may encapsulate QoS behavior with a TPID (collectively illustrated as "TPID+QOS 206") to an L2 packet, e.g., inner packet 208. In some examples, the TPID+QoS 206 is configured in accordance with the 802.1Q tag format. As one example, 802.1Q packet may comprise 32 bits with 16 bits reserved for the TPID ("Reserved TPID 207A"). The reserved TPID 207A may be 16 bits set to a value of 0x8xxx to identify the frame as an IEEE 802.1 Q-tagged frame. The remaining 16 bits of the 802.1Q packet is used to denote the QoS behavior 207B ("QOS 207B"). As one example implementation, QOS 207B may be 5 bits of the remaining 16 bits used to denote the QoS behavior derived by the source tunneling endpoint. More specifically, the source tunneling endpoint may set the first 3 bits of QOS 207B as the priority class 207C and set the following 2 bits as the drop precedence 207D. The remaining 11 bits ("Reserved 207E") may be used to carry other information, such as other QoS policy derivatives. The format structure of packet 200 illustrated in FIG. 2 is merely an example. For example, the QOS 207B may comprise any number of bits of an 802.1Q packet. In other examples, the TPID+QOS 206 is encapsulated with any packet format for any type of tunnel. In other examples, the TPID+QOS 206 may be a label in a label stack used to tunnel a packet over an intermediate network (e.g., intermediate network 12 of FIG. 1) that implements MPLS.

Figure 3:
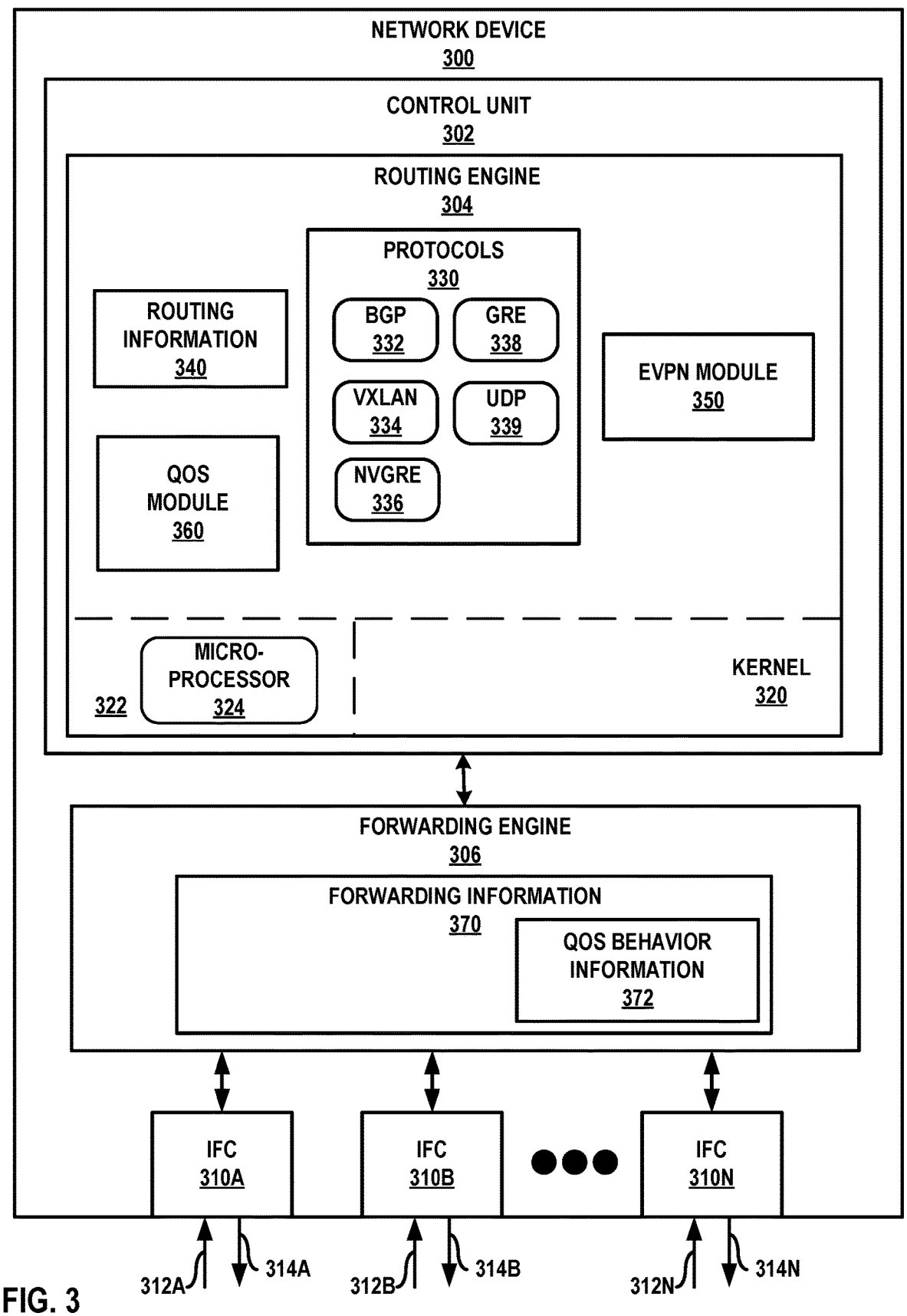
FIG. 3 is a block diagram illustrating an example network device configured to implement one or more techniques described herein.

FIG. 3 is a block diagram illustrating an example network device that is configured to implement one or more techniques described herein. Network device 300 may represent an example of any of PEs 10 of FIG. 1. Network device 300 is described with respect to PE 10A of FIG. 1, but may be performed by any network device operating as a tunneling endpoint. Network device 300 includes a control unit 302 having a routing engine 304, and control unit 302 is coupled to forwarding engine 306. Forwarding engine 306 is associated with one or more interface cards 310A-310N ("IFCs 310") that receive packets via inbound links 312A-312N ("inbound links 312") and send packets via outbound links 314A-314N ("outbound links 314"). IFCs 310 are typically coupled to links 312, 314 via a number of interface ports (not shown). Inbound links 312 and outbound links 314 may represent physical interfaces, logical interfaces, or some combination thereof.

Elements of control unit 302 and forwarding engine 306 may be implemented solely in software, or hardware, or may be implemented as combinations of software, hardware, or firmware. For example, control unit 302 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 302 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of network device 300, e.g., protocols, processes, and modules. Control unit 302, in some examples, retrieves and executes the instructions from memory for these aspects.

Routing engine 304 includes kernel 320, which provides a run-time operating environment for user-level processes. Kernel 320 may represent, for example, a UNIX operating system derivative such as Linux or Berkeley Software Distribution (BSD). Kernel 320 offers libraries and drivers by which user-level processes may interact with the underlying system. Hardware environment 322 of routing engine 304 includes microprocessor 324 that executes program instructions loaded into a main memory (not shown in FIG. 3) from a storage device (also not shown in FIG. 3) in order to execute the software stack, including both kernel 320 and processes executing on the operating environment provided by kernel 320. Microprocessor 324 may represent one or more general or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

Kernel 320 provides an operating environment that executes various protocols 330 at different layers of a network stack, including protocols for implementing an EVPN network. For example, routing engine 304 includes network protocols that operate at a network layer of the network stack. In the example of FIG. 3, protocols 330 may include routing protocols, such as Border Gateway Protocol (BGP) 332, or other routing protocols not shown in FIG. 3, such as Open Shortest Path First (OSPF), Multiprotocol BGP (MP-BGP). Protocols 330 may also include tunneling protocols, such as Virtual Extensible LAN (VXLAN) 334, NVGRE 336, GRE 338, UDP 339 and/or other tunneling protocols not shown in FIG. 3, such as MPLS tunneling protocols. Routing engine 304 is responsible for the maintenance of routing information 340 to reflect the current topology of a network and other network entities to which network device 300 is connected. In particular, routing protocols periodically update routing information 340 to reflect the current topology of the network and other entities based on routing protocol messages received by network device 300.

Forwarding engine 306 represents hardware and logic functions that provide high-speed forwarding of network traffic. Forwarding engine 306 typically includes a set of one or more forwarding chips programmed with forwarding information that maps network destinations with specific next hops and the corresponding output interface ports. In general, when network device 300 receives a packet via one of inbound links 312, forwarding engine 306 identifies an associated next hop for the data packet by traversing the programmed forwarding information based on information within the packet. Forwarding engine 306 forwards the packet on one of outbound links 314 mapped to the corresponding next hop, such as a tunneling endpoint or a network device in a local customer network.

In the example of FIG. 3, forwarding engine 306 includes forwarding information 370. In accordance with routing information 340, forwarding engine 306 stores forwarding information 370 that maps packet field values to network destinations with specific next hops and corresponding outbound interface ports. For example, routing engine 304 analyzes routing information 340 and generates forwarding information 370 in accordance with routing information 340. Forwarding information 370 may be maintained in the form of one or more tables, link lists, radix trees, databases, flat files, or any other data structures.

Forwarding engine 306 stores forwarding information 370 for each peer tunneling endpoint to associate network destinations with specific next hops and the corresponding interface ports. Forwarding engine 370 forwards the data packet on one of outbound links 314 to the corresponding next hop (e.g., peer tunneling endpoint) in accordance with forwarding information 370. At this time, forwarding engine 370 may encapsulate and/or de-encapsulate packet headers (or push and/or pop labels in the case of MPLS) from the packet to forward the packet to the next hop.

Routing engine 304 also includes an EVPN module 350 that performs L2 learning using BGP 332. EVPN module 350 may maintain MAC tables for each EVPN instance established by PE device 200, or in alternative examples may maintain one or more MAC tables that are independent of each respective EVPN instance. The MAC tables, for instance, may represent a virtual routing and forwarding table of VRFs for an EVI configured for the VRF. EVPN module 350 may perform local L2/L3 (e.g., MAC/IP) binding learning by, e.g., using MAC information received by PE device 200.

In accordance with the techniques described herein, network device 300, operating as a source tunneling endpoint, may encapsulate QoS behavior and tunnel the QoS behavior to a destination tunneling endpoint. For example, routing engine 304 may include a QOS module 360 to derive and encapsulate a QoS behavior to a packet, and/or to determine the QoS behavior from a received packet.

For example, network device 300 may receive a packet from one of inbound links 312. QoS module 360 may classify the packet based on various values in the packet (e.g., 5-tuple values). Based on the assigned class of service, network device 300 can apply different QoS behaviors that affects how network device 300 treats the traffic. For example, network device 300 may include a scheduler and/or one or more queues (not shown in FIG. 3) to apply the QoS behaviors. For example, a scheduler is used to control the order in which queues holding the traffic are serviced and transmitted out to the next hop in the traffic path. That is, schedulers are used to manage which packets are sent, the order in which the packets are sent, and/or how the packets are treated.

Routing engine 304 provides the QoS behavior derived from QoS module 360 to the forwarding engine 306 such that forwarding engine 306 may encapsulate an L2 packet with the QoS behavior information 372, in accordance with the techniques described herein. Forwarding engine 306 may encapsulate the derived QoS behavior in QoS behavior information 372 to an L2 packet. Forwarding engine 306 may in some examples encapsulate the derived QoS behavior with a TPID in accordance with the 802.1Q tag format. As one example, forwarding engine 306 may configure 16 bits of the 32 bits of an 802.1Q packet as the TPID and 5 bits as the QoS behavior. More specifically, forwarding engine 306 may configure 3 bits as the priority class and 2 bits as the drop precedence. Forwarding engine 306 may configure the remaining 11 bits to carry other information, such as other QoS policy derivatives.

Forwarding engine 306 may further encapsulate an outer tunnel transport header (e.g., outer header 202 and tunnel header 204 of FIG. 2) indicating at least a source/destination IP address of the tunneling endpoints, a source/destination MAC address of the tunneling endpoints, and a tunnel header. Forwarding engine 306 may then send the encapsulated packet via one of outbound links 314 mapped to the peer tunneling endpoint.

In an example where PE device 200 is a destination tunneling endpoint (e.g., PE 10B of FIG. 1), PE device 200 may receive an encapsulated packet from a source tunneling endpoint via one of inbound links 312. Forwarding engine 306 may de-encapsulate the packet and determine the QoS behavior value encapsulated to the packet. Forwarding engine 306 forwards the QoS behavior to QoS module 360, which may apply the QoS behavior. In this way, QoS module 360 of the destination tunneling endpoint does not re-derive the QoS behavior, and instead may apply the same QoS behavior that was derived by the source tunnel endpoint.

Figure 4:
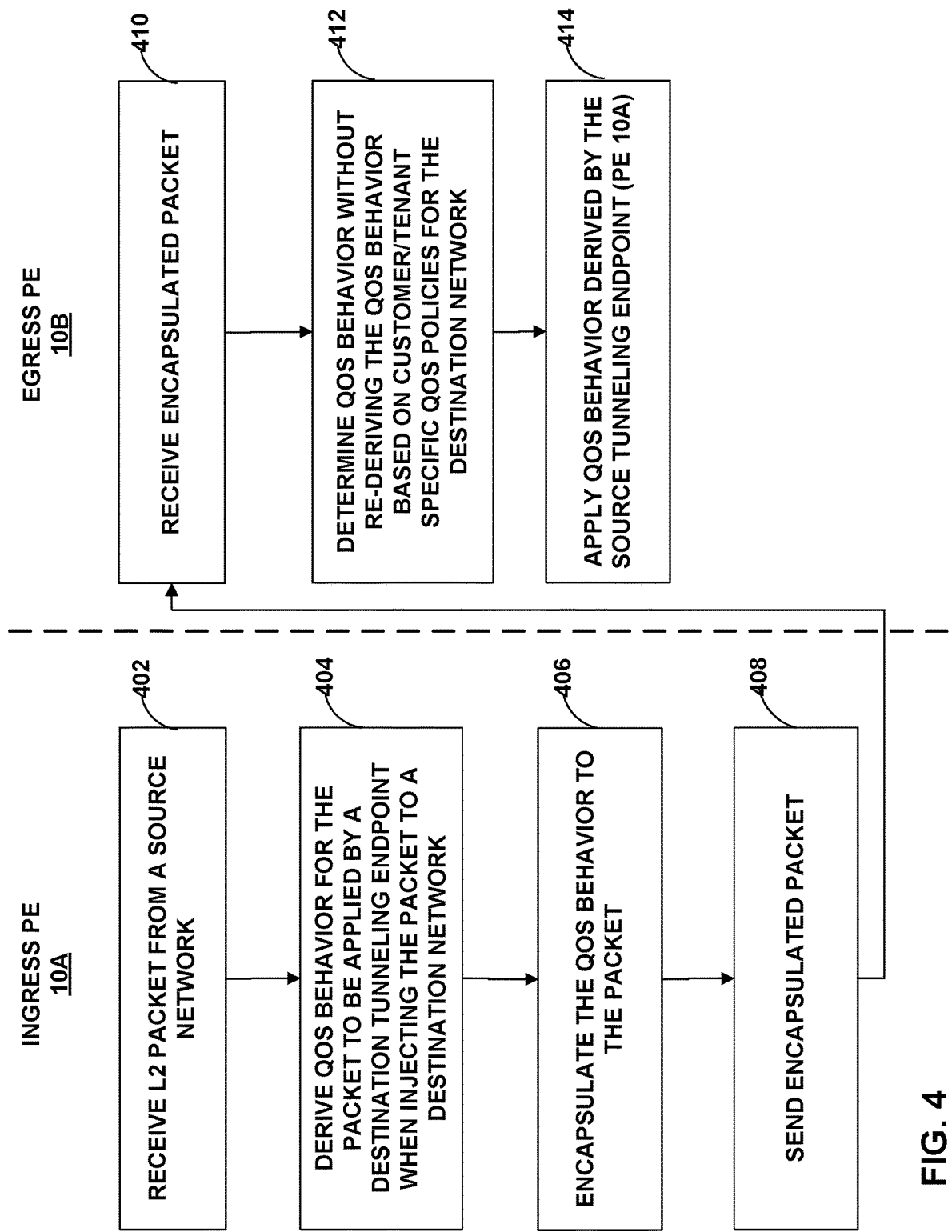
FIG. 4 is a flowchart illustrating an example operation of provisioning QoS behavior between tunneling endpoints, in accordance with the techniques described herein.

FIG. 4 is a flowchart illustrating an example operation of provisioning QoS behavior between tunneling endpoints, in accordance with the techniques described herein. FIG. 4 is described with respect to PEs 10 of FIG. 1 and with PE device 300 of FIG. 3.

In the example of FIG. 4, PE 10A may operate as a source tunneling endpoint and receive an L2 packet from a source network (402). For example, PE 10A may receive an L2 packet from a local customer network, e.g., customer network 6A, such as a site of an enterprise network, or from tenants of a data center network. QoS module 360 of PE 10A may derive a QoS behavior to be applied by a destination tunneling endpoint when injecting the packet to a destination network (404). For example, PE 10A may receive a packet from customer network 6A destined for customer network 6B. PE 10A may derive a QoS behavior for the receiving network, e.g., customer network 6B, and inject the derived QoS behavior into tunnel 16 such that the QoS behavior may be applied at the end of tunnel 16 by PE 10B upon injecting the packet into customer network 6B.

PE 10A may encapsulate the QoS behavior to the packet (406). For example, in response to deriving the QoS behavior, the routing engine 304 of PE 10A may provide the QoS behavior information 372 to forwarding information 370 such that PE 10A may encapsulate the QoS behavior information 372 to the packet before tunneling the packet across tunnel 16. Forwarding engine 306 may encapsulate the QoS behavior information 372, such as the priority class and drop precedence. As one example, forwarding engine 306 may encapsulate a tagging packet frame including the QoS behavior. For example, forwarding engine 306 may encapsulate the QoS behavior with a TPID in accordance with the 802.1Q tag format. More specifically, forwarding engine 306 may configure an 802.1Q packet to include 16 bits for the TPID, and 5 bits for the QoS behavior, wherein the 5 bits of the QoS behavior includes 3 bits for the priority class and 2 bits for the drop precedence. In some example, the forwarding engine 306 may also configure the 802.1Q packet to further include a QoS policy derivative (e.g., in the last 11 bits of the 802.1Q packet).

The forwarding engine 306 of PE 10A may also encapsulate an outer tunnel transport header that identifies the tunneling endpoints and send the encapsulated packet including the QoS behavior to a destination tunneling endpoint, e.g., PE 10B (408). In this way, PE 10A may derive the QoS behavior for the receiving network and inject the QoS behavior at the front-end of the tunnel such that the destination tunneling endpoint does not need to re-derive the QoS behavior. For example, when PE 10B receives the encapsulated packet, PE 10B may de-encapsulate the outer tunnel transport header and determine the QoS behavior encapsulated to the packet without re-deriving the QoS behavior based on customer/tenant specific QoS policies for the destination network (412). For example, PE 10B may de-encapsulate the packet and determine the priority class and drop precedence of the QoS behavior derived by PE 10A without having to re-derive the priority class and drop precedence based on customer/tenant specific QoS policies. PE 10B may apply the QoS behavior that was derived by the source tunneling endpoint, PE 10A (414).

The techniques of this disclosure may be implemented in a wide variety of devices or apparatuses, including a network device, an integrated circuit (IC) or a set of ICs (i.e., a chip set). Any components, modules or units have been described provided to emphasize functional aspects and does not necessarily require realization by different hardware units. The techniques described herein may also be implemented in hardware or any combination of hardware and software and/or firmware. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable storage medium comprising instructions that, when executed in a processor, performs one or more of the methods described above. The computer-readable storage medium may be a physical structure, and may form part of a computer program product, which may include packaging materials. In this sense, the computer readable medium may be non-transitory. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The code or instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

Various examples of the techniques have been described. These and other examples are within the scope of the following claims.

What is claimed is:

1. A method comprising:
   receiving, by a first provider edge (PE), a layer 2 (L2) packet from a source network that is destined for a destination network, wherein the first PE device is configured to provide a network overlay over a layer 3 core network using a tunneling protocol, and wherein the first PE device for the source network and a second PE device for the destination network are peer tunneling endpoints of a tunnel for the tunneling protocol;
   deriving, by the first PE device, a Quality of Service (QoS) behavior for the packet to be applied by the second network device when injecting the packet to the destination network;
   encapsulating, by the first PE device, the QoS behavior to the packet;
   encapsulating, by the first PE device, an outer tunnel transport header that identifies the peer tunneling endpoints to the packet, wherein the QoS behavior is encapsulated between the outer tunnel transport header and the L2 packet; and
   sending, by the first PE device, the encapsulated packet through the tunnel to the second PE device.

2. The method of claim 1, wherein the tunneling protocol comprises at least one of Virtual Extensible Local Area Network (VXLAN), Generic Route Encapsulation (GRE), Network Virtualization using GRE (NVGRE), and User Datagram Protocol (UDP).

3. The method of claim 1, wherein encapsulating the QoS behavior to the packet comprises:
   encapsulating, by the first PE device, a tagging packet frame including the QoS behavior to the packet.

4. The method of claim 3, wherein the tagging packet frame is an Institute of Electrical and Electronics Engineer (IEEE) 802.1q packet including a Tag Protocol Identifier (TPID) that indicates the tagging packet frame as an 802.1q packet.

5. The method of claim 1, wherein encapsulating the QoS behavior to the packet comprises:
   encapsulating, by the first PE device, a priority class; and
   encapsulating, by the first PE device, a drop precedence.

6. The method of claim 5, further comprising:
   encapsulating, by the first PE device, one or more QoS policy derivatives.

7. A network device comprising:
   one or more processors operably coupled to a memory, wherein the one or more processors are configured to:
      receive configuration data that configures the network device to provide a network overlay over a layer 3 core network using a tunneling protocol, wherein the network device for a source network and a second network device for a destination network are peer virtual tunneling endpoints for a tunnel of the tunneling protocol;

receive a layer 2 (L2) packet from the source network that is destined for the destination network;

derive a Quality of Service (QoS) behavior for the packet to be applied by the second network device when injecting the packet to the destination network;

encapsulate the QoS behavior to the packet;

encapsulate an outer tunnel transport header that identifies the peer tunneling endpoints to the packet, wherein the QoS behavior is encapsulated in between the outer tunnel transport header and the L2 packet; and send the encapsulated packet through the tunnel to the second network device.

8. The network device of claim 7, wherein the tunneling protocol comprises at least one of Virtual Extensible Local Area Network (VXLAN), Generic Route Encapsulation (GRE), Network Virtualization using GRE (NVGRE), and User Datagram Protocol (UDP).

9. The network device of claim 7, wherein, to encapsulate the QoS behavior to the packet, the one or more processors are further configured to:

encapsulate a tagging packet frame including the QoS behavior to the packet.

10. The network device of claim 9, wherein the tagging packet frame is an Institute of Electrical and Electronics Engineer (IEEE) 802.1q packet including a Tag Protocol Identifier (TPID) that indicates the tagging packet frame as an 802.1q packet.

11. The network device of claim 7, wherein, to encapsulate the QoS behavior to the packet, the one or more processors are configured to:

encapsulate a priority class; and encapsulate a drop precedence.

12. The network device of claim 11, wherein, to encapsulate the QoS behavior to the packet, the one or more processors are further configured to:

encapsulate one or more QoS policy derivatives.

13. A non-transitory computer-readable storage medium comprising instructions for causing at least one programmable processor of a network device to:

receive configuration data that configures the network device to provide a network overlay over a layer 3 core network using a tunneling protocol, wherein the network device for a source network and a second network device for a destination network are peer virtual tunneling endpoints for a tunnel of the tunneling protocol;

receive a layer 2 (L2) packet from the source network that is destined for the destination network;

derive a Quality of Service (QoS) behavior for the packet to be applied by the second network device when injecting the packet to the destination network;

encapsulate the QoS behavior to the packet;

encapsulate an outer tunnel transport header that identifies the peer tunneling endpoints to the packet, wherein the QoS behavior is encapsulated in between the outer tunnel transport header and the L2 packet; and send the encapsulated packet through the tunnel to the second network device.

14. The non-transitory computer-readable storage medium of claim 13, wherein the tunneling protocol comprises at least one of Virtual Extensible Local Area Network (VXLAN), Generic Route Encapsulation (GRE), Network Virtualization using GRE (NVGRE), and User Datagram Protocol (UDP).

15. The non-transitory computer-readable storage medium of claim 13, wherein the instructions further cause the one or more processors to:

encapsulate a tagging packet frame including the QoS behavior to the packet.

16. The non-transitory computer-readable storage medium of claim 15, wherein the tagging packet frame is an Institute of Electrical and Electronics Engineer (IEEE) 802.1q packet including a Tag Protocol Identifier (TPID) that indicates the tagging packet frame as an 802.1q packet.

17. The non-transitory computer-readable storage medium of claim 15, wherein the instructions further cause the one or more processors to:

encapsulate a priority class; and encapsulate a drop precedence.

* * * * *